(12) United States Patent
Bakker et al.

(10) Patent No.: US 11,634,165 B2
(45) Date of Patent: Apr. 25, 2023

(54) ROBOTIC VEHICLE, SYSTEM THEREWITH AND USE THEREOF

(71) Applicant: EUROTEC B.V., Bleskensgraaf (NL)

(72) Inventors: Jan Bakker, Bleskensgraaf (NL); Bastiaan Dirk De Gier, Wijngaarden (NL); Jacobus Van Den Berg, Streefkerk (NL); Jeroen Van Den Berg, Hendrik-Ido-Ambacht (NL)

(73) Assignee: Eurotec B.V., Bleskensgraaf (NL)

( * ) Notice: Subject to any disclaimer, the term of this patent is extended or adjusted under 35 U.S.C. 154(b) by 409 days.

(21) Appl. No.: 16/629,256

(22) PCT Filed: Jul. 9, 2018

(86) PCT No.: PCT/NL2018/050452
§ 371 (c)(1),
(2) Date: Jan. 7, 2020

(87) PCT Pub. No.: WO2019/009729
PCT Pub. Date: Jan. 10, 2019

(65) Prior Publication Data
US 2020/0172139 A1    Jun. 4, 2020

(30) Foreign Application Priority Data

Jul. 7, 2017   (EP) .................................... 17001161
Jul. 26, 2017  (NL) .................................... 2019350

(51) Int. Cl.
*B60P 1/02*      (2006.01)
*B62B 5/00*      (2006.01)
*B62B 3/10*      (2006.01)

(52) U.S. Cl.
CPC .............. *B62B 5/0083* (2013.01); *B60P 1/02* (2013.01); *B62B 5/0046* (2013.01);
(Continued)

(58) Field of Classification Search
CPC ..... B62B 2301/20; B62B 3/10; B62B 5/0069; B62B 5/0083; B60P 1/02; G05D 1/0291
(Continued)

(56) References Cited

U.S. PATENT DOCUMENTS

| 5,415,109 | A   | * | 5/1995  | McBride ............ B65D 19/0002 108/57.29 |
| 9,829,892 | B1  | * | 11/2017 | Rodoni ................ G05D 1/0295 |
| 10,466,699 | B2 | * | 11/2019 | Hirata .................... B60L 50/53 |
| 2003/0218307 | A1 |   | 11/2003 | Anderson et al. |

(Continued)

FOREIGN PATENT DOCUMENTS

| CN | 206827443 U | * | 1/2018 |
| DE | 29818249 U1 |   | 2/2000 |

(Continued)

OTHER PUBLICATIONS

International Searching Authority At European Patent Office; international search report and written opinion of the international searching authority for international application PCT/NL2018/050452 dated Jan. 21, 2019 (includes English translation of section V of written opinion); 19 pages total.

*Primary Examiner* — James A Shriver, II
*Assistant Examiner* — Hilary L Johns
(74) *Attorney, Agent, or Firm* — McDonnell Boehnen Hulbert & Berghoff LLP (57) ABSTRACT

Robotic vehicle and use thereof for displacing a holder for goods, which is for instance loaded with goods, which vehicle can be operated in an empty position and a loaded position, comprising of (1) moving the robotic vehicle to a position under the holder in a first direction, wherein the robotic vehicle is in the empty position, wherein a holding means is countersunk in a body of the vehicle; (2) lifting the holder, wherein the robotic vehicle lifts the holder by performing a vertical movement of the holding means (Continued)

relative to the wheels of the vehicle, such that the holding means comes into contact with an underside of the holder, wherein the robotic vehicle transfers to the loaded position; (3) rotating driven wheels of the robotic vehicle from the first direction to the second direction without the body of the vehicle being rotated, and (4) displacing the robotic vehicle in the loaded position in a second direction, wherein the first and second direction enclose a mutual angle of between 60 and 120 degrees, preferably 75 and 105 degrees, more preferably 85 and 95 degrees, such as a substantially right angle.

21 Claims, 5 Drawing Sheets

(52) U.S. Cl.
CPC .............. *B62B 5/0069* (2013.01); *B62B 3/10* (2013.01); *B62B 2301/20* (2013.01)

(58) Field of Classification Search
USPC .......................................................... 180/41
See application file for complete search history.

(56) References Cited

U.S. PATENT DOCUMENTS

| | | | | |
|---|---|---|---|---|
| 2007/0297879 A1* | 12/2007 | Yuyama | ................ | B62B 5/0083 280/79 |
| 2014/0251704 A1* | 9/2014 | Sekine | ................. | B62B 5/0069 180/65.1 |
| 2018/0305126 A1* | 10/2018 | Moulin | ................ | B65G 1/1378 |

FOREIGN PATENT DOCUMENTS

| | | | | | |
|---|---|---|---|---|---|
| DE | 202014006562 U1 | | 8/2014 | | |
| DE | 102014017255 A1 | * | 5/2016 | ........... | B62B 3/0612 |
| EP | 1799540 | | 6/2007 | | |
| EP | 2336075 A1 | * | 6/2011 | ............ | B60K 17/30 |
| EP | 2336075 A1 | | 6/2011 | | |
| EP | 2102091 B1 | | 6/2013 | | |
| EP | 2837545 A2 | * | 2/2015 | ............ | B62B 3/001 |
| EP | 2837545 A2 | | 2/2015 | | |
| EP | 1799540 B1 | | 4/2016 | | |
| EP | 3224111 A1 | * | 10/2017 | ........... | B62B 3/0612 |
| FR | 2267976 A1 | | 11/1975 | | |
| JP | H09185409 A | | 7/1997 | | |
| WO | 2006044108 A2 | | 4/2006 | | |
| WO | WO-2017064428 A1 | * | 4/2017 | ............ | B62D 63/02 |

* cited by examiner

ROBOTIC VEHICLE, SYSTEM THEREWITH AND USE THEREOF

FIELD OF THE INVENTION

The invention relates to a robotic vehicle with a front side and a rear side which is suitable for displacing a holder for goods, which robotic vehicle is configured to move to a position under the holder, to lift the holder and to displace the holder, comprising a first and a second wheel, which wheels are motor-driven; at least one further wheel; a holding means for carrying the holder, which holding means is situated on an upper side of the body; a moving means for performing a vertical movement of at least the holding means between an empty position and a loaded position, in which empty position the vehicle is able to pass under the holder and in which loaded position the vehicle carries the holder, such that when the vehicle moves, the holder is carried along; a control unit for controlling the vehicle and controlling the first and the second wheel and the moving means.

The invention further relates to a combination of a robotic vehicle with a front side and a rear side and a holder for goods, wherein the robotic vehicle is configured to move to a position under the holder, to lift the holder and to displace the holder.

The invention also relates to the use of the robotic vehicle for displacing the holder.

The invention moreover relates to a system of at least one robotic vehicle and a central control unit which is configured to control the one or more robotic vehicles.

BACKGROUND OF THE INVENTION

Such a robotic vehicle, such a system and a combination of vehicle and holder are per se known from EP1799540B1 in the name of Amazon Technologies. This patent shows an example of a vehicle which is also known under the name 'automated guided vehicle', abbreviated as 'AGV'. It is known that the system has been fully developed and is in service in one or more of Amazon's logistics centres. The known robotic vehicle is provided with a holding means in the form of a docking head, which is height-adjustable with the moving means. Largely conical protrusions are present on the docking head. These protrusions can be inserted into holes in a docking plate of the holder. The holder is fixed to the vehicle on the basis of this per se known locking mechanism. In a particular embodiment shown in EP2102091B1 the moving means is a shaft provided with screw thread. The screw thread is extended or retracted by rotation of the vehicle around its axis. This achieves that the docking plate is fixed to or released from said docking head of the vehicle.

A drawback of the known system is that use must be made of holders designed specifically for the vehicles. This makes the system suitable for use within a large logistics centre, where goods usually come in individually. It is however less suitable when goods come in by the load and leave the logistics centre by the load again after being sorted. This is because, in such a situation, the load must first be transferred to the holders. This is particularly the case for use in agriculture and horticulture. This is because the goods are in this case vegetables, fruit and plants. The chance of damage occurring increases each time such goods are transferred.

OBJECT OF THE INVENTION

It is thus an object of the invention to provide an improved vehicle of the type described in the opening paragraph, which is better suited to situations wherein goods are supplied and discharged in loads, particularly agriculture and horticulture.

Further objects of the invention are to provide a combination of a vehicle with a holder, and the use of the holder.

A further object still of the invention is to provide a system of the robotic vehicle and a central control unit.

The first object of the invention is achieved in a robotic vehicle suitable for displacing a holder for goods, which robotic vehicle is configured to move to a position under the holder, to lift the holder and to displace the holder, comprising a body; a first and a second wheel, and drive means co-acting with said wheels; at least one further wheel; a holding means for carrying the holder, which holding means is situated on an upper side of the body; a moving means for performing a vertical movement of at least the holding means between an empty position and a loaded position, in which empty position the vehicle is able to pass under the holder and in which loaded position the vehicle carries the holder, such that when the vehicle moves, the holder is carried along, and a control unit for controlling the vehicle and controlling the first and the second wheel and the moving means. According to the invention, the first and the second wheel are mounted rotatably on the body, wherein the control unit is configured such that the vehicle can be moved in at least two directions of travel which are perpendicular relative to each other.

The second object is achieved in a combination of the robotic vehicle according to the invention and a holder for goods, wherein the robotic vehicle is configured to move to a position under the holder, to lift the holder and to displace the holder. A system of at least one vehicle and a central control unit is also provided. The system preferably comprises several robotic vehicles which are all controlled by the central control unit.

The third object is achieved in a method for displacing a holder for goods, which is for instance loaded with goods, using a robotic vehicle, which vehicle can be operated in an empty position and a loaded position, which method comprises the following steps of:

moving the robotic vehicle to a position under the holder in a first direction, wherein the robotic vehicle is in the empty position, wherein a holding means is countersunk in a body of the vehicle;

lifting the holder, wherein the robotic vehicle lifts the holder by performing a vertical movement of the holding means relative to the wheels of the vehicle, such that the holding means comes into contact with an underside of the holder, wherein the robotic vehicle transfers to the loaded position, rotating driven wheels of the robotic vehicle from the first direction to the second direction without the body of the vehicle being rotated, and displacing the robotic vehicle in the loaded position in a second direction, wherein the first and second direction enclose a mutual angle of between 60 and 120 degrees, preferably 75 and 105 degrees, more preferably 85 and 95 degrees, such as a substantially right angle.

The invention makes it possible to apply existing and non-specific holders in combination with the vehicle. A preferred embodiment of such holders are so-called Danish trolleys, also known as CC trolleys and CC containers, which are applied on a large scale in the horticultural industry. Other examples of holders which can be displaced advantageously according to the invention include shopping trolleys and vegetable carts. This is more specifically achieved in that the vehicle need not rotate as a whole, but that the first and second wheels are rotatable relative to the body of the vehicle. In this way a vehicle can be moved to a position under a holder from a side, i.e. a first direction. After a predetermined position under the holder has been reached, the holder is lifted and further supported by the vehicle. The motor-driven first and second wheels are also rotated. The holder can then be displaced in the second direction, for instance in a direction corresponding to a longitudinal direction of the holder.

The at least two directions of movement of the vehicle preferably comprise a longitudinal direction and a width direction of the vehicle. More preferably, a control unit is present and the control unit is configured such that the vehicle can be moved in a desired direction which encloses an angle of between −180 and +180 degrees with a longitudinal direction of the vehicle.

It is noted that in the known vehicle the rotation of the vehicle as a whole is an essential part of thus moving the holding means. This also requires extra time, and makes the known vehicle less efficient. In the vehicle according to the invention this is not necessary. In order to still achieve an appropriate positioning of the vehicle relative to the holder and in order to ensure that the holder is unable to come away from the vehicle during the displacement use is in particular made of bars of the frame of the holder, which are situated on either side of a bottom plate. These bars are generally manufactured from a metal or alloy such as steel. They can be easily detected optically, for instance on the basis of the reflection thereof. They can furthermore be properly supported. In a favourable embodiment support elements are incorporated in the body of the vehicle, which elements are positioned substantially at positions in the body which correspond to the positions of the bars when the holder and the vehicle are positioned correctly relative to each other. The support elements can be embodied as beams and likewise in the form of resilient elements, such as one or more damping springs.

In a favourable embodiment first and second drive means are present for respectively the first wheel and the second wheel. This means that the wheels are driven independently of each other and can be rotated independently of each other. In a particularly favourable implementation no axle is present between the first wheel and the second or a further wheel. Instead, the first wheel—and in corresponding manner the second wheel—is only suspended locally on the body.

In an important embodiment the body comprises a chassis provided with wheel module holders, wherein the first and the second wheel each form part of a wheel module which is situated in a wheel module holder of the chassis. The assembly of wheel modules in wheel module holders of the chassis designed therefor enables the first wheel to be mounted rotatably on the body in simple manner In more detail, a wheel module according to this embodiment comprises a housing in which the wheel is suspended on a shaft. At least a part of the first drive means is also integrated in the housing. The used one or more electric motors are however preferably situated outside the wheel module assembled in the wheel module holder. A chassis further provides the body with a stable construction and enables determined parts of the body, including the holding means, to be adjusted in the height using the moving means in order to thus reach the loaded position.

It is preferred for the vehicle to comprise at least four wheels, wherein the four wheels are situated at the corners of the vehicle, more preferably in the wheel module holders of the chassis. By placing the wheels in the corners of the vehicle the mass is distributed such that there is a minimal risk of the vehicle with the holder thereon falling over.

In a further embodiment the chassis comprises a first and a second longitudinal beam and a first and a second transverse beam, which longitudinal beams and transverse beams are embodied as upright walls, wherein the wheel module holders are preferably situated in the corners between in each case a transverse beam and a longitudinal beam. The chassis thus forms an essentially rectangular frame. The embodiment as upright walls increases the stiffness. A bottom plate can optionally be arranged between the longitudinal beams, as part of the chassis. This is however not necessary. More transverse beams can optionally be present, which is not deemed strictly necessary either.

In yet another embodiment the moving means comprises guide means between the chassis and an element, such as a tray, placed inside the chassis. The placing of an element inside the chassis has the advantage that ground clearance is created in the loaded position, whereby the vehicle is also able to function properly on floors which are less level. Not only is a part on a body lifted upward here, but an element, more particularly a tray or a hollow body, is lifted upward. The use of a chassis with upright side walls has the additional advantage here that it is possible to mount thereon guide means which on the one hand have sufficient size to guide the element in the movement and on the other hand do not protrude downward, which would once again limit the ground clearance. It is noted that the tray is preferably provided with a cover. A tray is favourable here because further components, such as a battery and electronics, can be accommodated in the tray.

In an implementation thereof, the guide means on the chassis are situated on the longitudinal beams or on the transverse beams, and preferably on the longitudinal beams The guide means are thus mounted on only one pair of side walls instead of on all sidewalls. This prevents the element, such as a tray, having to be manufactured with a very small tolerance relative to the chassis. Manufacture with such a small tolerance would greatly increase the manufacturing costs. Furthermore, this setup allows mounting inside the chassis of not only an element such as a tray, but of several elements. In a specific implementation a tray with cover is for instance applied as first element and, in addition, a plate, optionally with downward protruding side walls, as second element. Such options make it possible to further tailor the vehicle to an expected load.

Still more preferably, the first wheel is mounted on the body at a first position, and the second wheel is mounted on the body at a second position, which second position differs from the first position in the longitudinal direction and in the width direction. The two motor-driven wheels are thus not situated adjacently of each other, nor one behind the other. This is deemed advantageous, so that the vehicle can move in two mutually perpendicular directions.

More particularly, the body can be divided into four quadrants in top view, wherein the first wheel is situated in a first quadrant and the second wheel in a third quadrant. In other words, it is the case that the first and the second wheel are situated in two quadrants which are mirrored relative to each other around a centre point. In a specific embodiment the first and the second wheel are arranged on a diagonal. This enables the vehicle to be rotated round the vertically oriented axes of said wheels, but also round a centre point of the vehicle. When rotated around a centre point, the vehicle remains substantially in place. It is noted here that the vehicle need not be square, round, hexagonal and so on. It is deemed more advantageous for the vehicle to have a substantially elongate form, with a greater dimension in the longitudinal direction than in the width direction. In this favourable implementation a rotation round a centre point does entail some variation of the positioning. It is further not necessary, although advantageous, for the centre point to be the stereometrically determined centre point. The centre point can otherwise be a point in a middle part of the vehicle, around which point a rotation can be performed using the first and the second wheel. Such a rotation point outside of the metric centre point can for instance be advantageous for performing a movement, wherein the position of a front side of the holder for instance changes a lot less than that of a rear side of the holder. Such a virtual point of rotation is further suitable for realizing gentle curves with the vehicle.

It is noted that it is not precluded that the vehicle comprises more than a first and a second motor-driven wheel, for instance three or four wheels. These wheels are then preferably distributed uniformly over the four quadrants and are preferably situated in the form of a wheel module in the wheel module holders situated at the corners of the chassis. The presence of four motor-driven wheels is intended particularly for lifting and displacing heavy loads. It is advantageous here, though not necessary, for all the wheels to also have a drive for adjusting an orientation. In a specific embodiment a vehicle with more than two motor-driven wheels is applied for displacing a series of mutually coupled holders, just as carriages of a train. In such a use the vehicle will also be placed under a holder. The vehicle carrying the (first) holder then functions as a locomotive for the train of the remaining holders coupled to the (first) holder. It is very advantageous in this respect for the holding means to be configured to prevent sliding of the first holder due to the mass of the whole train. It is particularly the presence of metal bars on an underside of the holder which makes this possible, as will be further elucidated hereinbelow.

In a favourable embodiment the first and the second wheel are mounted rotatably on the body, wherein the control unit is configured such that the vehicle can be moved in a desired direction which encloses an angle of between −180 and +180 degrees with the longitudinal direction. In this embodiment the vehicle can be moved in any direction (in the x-y-plane), i.e. in any imaginable direction, including the rotation about its own central axis. This is advantageous for the greatest possible flexibility of the displacement. Nevertheless, it is not precluded that the control unit is configured to perform movements in a limited number of directions, or only in more limited domains, for instance in a range which encloses an angle of between −30 and +30 degrees with the longitudinal direction of the vehicle and in a range which enclose an angle of between −30 and +30 degrees with the width direction of the vehicle. Such a setting prevents the vehicle moving in a direction of travel while a corner point of the vehicle points straight forward. Although not impossible, as yet it is deemed less simple to record images with optical sensors in such a direction. This drawback is particularly present when travel in such a direction of travel takes place over a greater distance.

In yet another embodiment the chassis is provided with a means for adjusting a height of a wheel module holder relative to the chassis. The means is preferably configured such that the height of the wheel module holder is automatically adjusted. Automatically is understood here to mean during the movement of the vehicle and preferably without instructions from a control unit. It is in this way prevented that one of the wheels loses contact with a floor due to local height differences in the floor. In a favourable embodiment the means is a transverse beam or a longitudinal beam of the chassis, to which a first and a second wheel module holder are connected and which is rotatable relative to an adjoining transverse beam or longitudinal beam around an axis. This is more preferably a transverse beam.

It is further advantageous for optical sensors for recording images to be present on at least one side of the vehicle, wherein the control unit is configured to control the vehicle partly on the basis of the recorded images. The presence of such optical sensors is usually in the context of AGVs. Typically, this relates to a digital camera and optionally a light source, for instance on the basis of LEDs. In the context of the present invention it is preferred for the optical sensors to be situated on the chassis or in a module which is coupled to the chassis. This has the advantage that the location of the sensors is not influenced by the position of the part of the body displaceable in the height, such as a tray. In a first implementation such sensors and light sources are attached to the chassis, for instance in cavities designed for this purpose. For light sources such as LEDs this has the advantage that the released heat can be discharged effectively because the chassis functions as a heat distributing means. In a second implementation the optical sensors are attached on an inner side of the chassis, wherein an opening is present in the chassis which allows an image to be recorded and/or light to be emitted. This provides the option of designing the opening so as to thus achieve a suitable diffusion of the light and/or angle of view.

In a favourable embodiment optical sensors are present on at least two sides of the vehicle, such that the sensors are able to record images in the at least two mutually perpendicular directions of travel of the vehicle. In practice, it is deemed advantageous for optical sensors to be present on all four sides.

In a favourable embodiment the first wheel is provided with a drive means for rotating the wheel about its axle and with a controlling means for adjusting an orientation of the wheel relative to the longitudinal direction of the vehicle. In this embodiment the drive for the forward movement, acceleration and deceleration of the wheel is disconnected from the drive for controlling the wheel, i.e. adjusting the orientation. Such a division makes it easy or even possible to adjust the orientation without performing a forward movement. This moreover allows an effective control of the forward movement. It has been found that it is not necessary to arrange a separate brake. It has furthermore been found possible with this embodiment and in the above stated implementation of the first and the second wheel placed on a diagonal to have the vehicle rotate round its axis while the vehicle performs a forward movement. A considerable time-saving can hereby be achieved in the transport of a holder. Processes, recordings and measurements can in particular be performed while the vehicle with the holder moves and rotates, wherein a rotation of 180 or 360 degrees is preferably performed. A second advantage is that the vehicle with a loaded holder thereon needs to stop and restart less often. In order to set a vehicle into motion the frictional resistance must be overcome. This requires extra energy, which has an adverse effect on the operating time of the battery. It can moreover reduce the stability of the combination of vehicle with holder, for instance in that a holder begins to shift relative to the vehicle.

In a preferred embodiment said drive means and the controlling means both comprise a vertically oriented shaft to an electric motor. This facilitates the electric motor being incorporated in the vehicle, such as in or on the chassis, in efficient manner In a favourable development the wheel is provided with a toothed wheel which extends parallel to the wheel and on which the drive means engages. In one specific embodiment the drive means is situated inside a bushing. The bushing thus forms a separation between a part of the housing which can rotate with the controlling means and the drive means which is connected to an electric motor and/or body which does not rotate. The bushing is further a suitable structural element with which the load can support on the wheels. The bushing is for instance connected to the body with a rotatable coupling or bearing.

In yet another development the first wheel is suspended on a housing, which housing is provided with a transmission means extending substantially in horizontal direction, which transmission means is configured to co-act with the controlling means in order to set a desired orientation of the wheel. This transmission means is preferably a toothed wheel, although use can also be made of transmission with a belt, a chain or other per se known transmission means. The combination of the housing and the transmission means provides for a suitable element.

The holding means in the vehicle according to the invention can be embodied in different ways. It is generally advantageous for the holding means to comprise a layer with a rough and/or tough surface, for instance a layer of rubber-elastic material. Such a layer increases the resistance to shifting of the holder relative to the vehicle. It is possible here for the layer to be locally thickened and/or comprise protrusions and/or channels. Such thickened portions, protrusions and/or channels are preferably arranged in accordance with a form of the bottom of the holder. A channel bounded by thickened portions on either side for instance forms a suitable bed for a bar at the bottom of the holder.

In a further embodiment the holding means is configured to secure bars situated on either side of a bottom of the holder. The bars form a stable base. It is an option here for the body to be provided with carrier elements at positions corresponding to the intended location of the bars. In this way the mass of the holder is adequately distributed over the vehicle. The carrier elements are for instance embodied as one or more damping springs. The holding means can be embodied here as a holder, for instance with a U-shaped or L-shaped profile which substantially corresponds to the shape of the bars.

In a specific implementation thereof, the bars comprise magnetic or magnetizable material and the holding means comprises a magnet, for instance an electromagnet. An example of a magnetic or magnetizable material is for instance steel. By making use of a magnet the holding means is not only able to make contact with the bars, but there is also an attraction between the two. This provides additional stability. An electromagnet is deemed to be particularly advantageous because the degree of attraction can be adjusted herein with the current intensity. The attraction can thus be reduced when the vehicle has to be removed from the holder.

The holding means can here be embodied as an upper side of the body but also as a separate element. In the first case the moving means is configured to displace at least an upper side of the body between the empty position and the loaded position. In the latter case the holding means comprises an element which is displaceable relative to the body using the moving means. In an embodiment deemed particularly advantageous the wheels are provided with a suspension on a shaft, a length of which is adjustable. The movement from the empty position to the loaded position is hereby performed effectively in that the wheels are pushed downward. This embodiment is very suitable for the setup of the wheels with a drive means and a controlling means separately of each other and preferably both provided with a vertically directed shaft.

It is noted in this respect that the body according to the invention need not be a solid body, but is preferably hollow and provided with a carrier plate and an upper plate. The inner side of the body is suitable here for assembly of required components, including sensors, electric motors, electronics and one or more batteries, generally rechargeable batteries as per se known to the skilled person.

In a further embodiment the moving means comprises one or more springs for transferring the vehicle from the empty position to the loaded position and/or vice versa. In one implementation a first spring and a damping spring are present. The first spring can here be compressed from a first position to a second position, in which second position a fixing means is present. The second position corresponds here to the empty position of the vehicle. The damping spring is situated between an upper plate and a carrier and can be compressed under load of the holder. The moving means is in particular configured such that the damping spring is only active under load of a holder. In this implementation the first spring is in its compressed state when the vehicle is in the empty position. When a fixing means is released, the first spring extends. The first position preferably lies further away from the second position than the loaded position lies from the empty position. Present in addition to the first spring is a damping spring which prevents the downward movement under the influence of the load of the holder. This damping spring preferably has a greater spring constant than the first spring, and is thus stiffer. Means are further present for ensuring that the damping spring is only active in the loaded position of the vehicle. The damping spring can for instance rest on a carrier which is adjustable in the height. It is thus achieved that the damping spring determines the extent to which the upper side of the body drops down under the load of the holder. At the same time, the damping spring does not interfere with the transition, controlled by the first spring, from the empty position to the loaded position. Such a damping spring can be embodied as a compression or tension spring, for instance as helical spring. An air bearing, a gas cylinder or a hydropneumatic means, for instance making use of one or more suspension spheres, form alternative options.

Optical sensors for recording images are generally present on the front side and/or on the rear side of the vehicle, and the control unit is generally configured to control the vehicle partly on the basis of the recorded images. The presence of optical sensors on the front and rear side is per se known within the field of AGVs.

In a further embodiment the vehicle further comprises optical sensors for recording images on sides of the vehicle, wherein the control unit is configured to control the vehicle partly on the basis of the recorded images. Such sensors are favourable because the vehicle according to the invention is able to move sideways. Instead of or in addition to optical sensors, RFID chips can be present in the vehicle, which chips can communicate with RFID chips in the floor or in a cable in the ground using wireless communication.

In a favourable embodiment the vehicle further comprises at least one sensor aimed at detecting a holder situated on an upper side of the vehicle, and wherein the control unit is configured to:

analyse detected data in order to determine an orientation of the vehicle relative to the holder;

control the first and/or the second wheel when the orientation of the vehicle has to be adjusted in order to achieve a predetermined relative orientation;

analyse detected data in order to determine a positioning of the vehicle relative to the holder;

control the first and the second wheel when the positioning of the vehicle has to be adjusted in order to achieve a predetermined placement.

The use of one or more upward directed sensors is favourable for controlling thereby both the orientation and the placement of the vehicle relative to the holder. The at least one sensor is preferably configured to detect metal bars situated on either side of a bottom plate of the holder. The detecting of metal bars is advantageous because the metal reflects light. Not much light is thus needed for an adequate identification of the metal bar. Such a metal bar is furthermore generally straight. The position but also the relative orientation can thus simply be determined using one and preferably two or more sensors placed at a suitable mutual distance. The suitable relative placement is for instance such that different parts of the holder can be recorded and that the first and the second optical sensor are situated on the same side of the body, wherein the first optical sensor is situated closer to the front side than the second optical sensor. More preferably, at least two optical sensors are present on both sides of the body. In this context a placement on a side is understood to mean a placement inside the body, wherein the distance to the one side is much smaller than the distance to an opposite side. The ratio between the distances to both sides is for instance at least 5:1, more preferably at least 10:1. The sensors are directed toward the upper side, for instance through a window on the upper side of the body, for instance embodied with transparent material. Instead of or in addition to these optical sensors it is possible to apply proximity switches for this purpose, i.e.: sensors which react to metal.

The control unit is preferably configured to use data detected during movement of the vehicle relative to the holder for the purpose of determining a relative orientation. This is advantageous because this saves time: firstly, it is not necessary to halt the vehicle for the recording. Secondly, an optional adjustment of the orientation can be performed during the further movement of the vehicle by rotation of the first and/or the second wheel.

The invention further relates to a robotic vehicle with a front side and a rear side which is suitable for displacing a holder for goods, which vehicle is configured to move to a position under the holder, to lift the holder and to displace the holder, comprising:

A body extending in a longitudinal direction between the front and the rear side of the vehicle, which body is provided on an upper side with a holding means for carrying the holder;

A first and a second wheel, which wheels are motor-driven, and at least one further stabilizing wheel;

A moving means for performing a vertical movement of at least the holding means between an empty position and a loaded position, in which empty position the vehicle is able to pass under the holder and in which loaded position the vehicle carries the holder, such that when the vehicle moves, the holder is carried along;

A control unit for controlling the vehicle and controlling the first and the second wheel and the moving means, wherein the holding means is configured to secure one or more bars situated on either side of a bottom of the holder.

Such a vehicle, and particularly in the embodiment wherein the holding means comprise magnets, such as electromagnets, is deemed very advantageous for serving as locomotive, as already indicated above and further stated in the claims.

The vehicle of the invention is preferably provided as part of a system with a central control unit which is configured to control the vehicle. The system comprises in particular a plurality of vehicles, which are each controlled by the central control unit. The control unit is preferably configured to calculate the displacements of vehicles and in principle prevent collisions from occurring. It is deemed advantageous to make use of wireless communication means for the communication between the central control unit and the vehicles. The vehicle is for this purpose preferably provided with a transmitter and a receiver and one or more antennas, which are aimed at receiving and/or transmitting signals. Antennas and data protocols are per se known. Transmission and reception modules for wireless communication are commercially available. For transmitting data from the central control unit to an individual vehicle use can be made of targeted communication, but also of bus protocols. Such protocols for data communication between control units are per se known for wired and wireless communication. An example is $I^2C$.

The control unit is preferably also configured for the logistical processing of the holders and the goods thereon, which enter and then leave a warehouse. Each holder is for this purpose preferably provided with an identification means, for instance a code, which is visibly or digitally coupled to the holder. Examples are barcodes and RFID chips. Both can be connected to the holder in the form of a label. It is further deemed advantageous for the vehicle also to be provided with its own identification means. In a further embodiment the vehicle is provided with a reading means for reading an identification means of the holder. This is preferably an RFID. The identification means is herein preferably situated on an underside of the holder, and the reading means is configured to read in upward direction when the vehicle is situated under the holder or passes under it. The vehicle can then send a read identification code to the central control unit. This can take place via a protocol other than RFID, which enables wireless communication over a greater distance than RFID.

One or more identification means can otherwise or additionally be present on one or more sides of the holder and/or the vehicle, which means can be read by external recording means. Such identification means need not be of the same type as the identification means intended to be read by the reading means of the vehicle (insofar as this reading means is present). Use can for instance be made of a barcode which can be read with a camera. It is precisely for reading of the identification means arranged on a side of the holder that it is very advantageous for the vehicle according to the invention to be able to rotate round its axis and preferably also rotate during a forward (or rearward) movement of the vehicle. In this way it is possible to ensure that the distance between the identification means and the recording means and the relative orientation can be achieved which enable adequate reading of the identification means.

More preferably, the system thus comprises one or further recording means. Examples of these recording means are the reading means for reading the identification means of the holder, reading means for reading identification means of individual goods, digital cameras for recording the goods and particularly their shape and/or other external characteristics, a means for weighing the combination of a vehicle and a holder which is optionally loaded with goods, and so on. These recording means are configured to send the recorded images and/or other information to the central control unit. The recording means can also be provided with a means for receiving instructions from the central control unit.

In yet another embodiment the system further comprises means for performing a process on the holder and/or the goods loaded thereon. A first example of such a means is a device for arranging a packaging around the holder. A specific embodiment thereof is a wrapping device for wrapping transparent film around the holder. A second example of such a means is a device for spraying one or more goods. A spraying device is deemed particularly advantageous when the goods are plants which require moistening. The spraying device can be configured to spray leaves and/or spray the plant soil. A desired substance, including a vaccine, a nutrient, an insecticide and/or a colorant, can further be administered with the spraying device. A third example is a device for illuminating one or more goods. Illuminating goods can provide for heating, disinfection, particularly with UV radiation, but also for plant growth. A fourth example is a device for cutting or otherwise removing material. The material to be removed can be a packaging of the holder, such as a wrapped film. The material to be removed can further be part of one or more goods, such as a leaf or branch of a plant.

In yet another embodiment the system comprises means for taking up goods from the—first—holder and placing goods on a—second—holder. Such means are per se known in the horticultural industry for sorting plants and or fruits according to size and/or on the basis of a different selection criterion. The goods are here usually taken from the first holder on a first side and placed on the second holder on a second side. A plurality of holders is typically present.

It is an advantage for all the stated embodiments of the system that the combination of vehicle and holder is rotatable round its axis and preferably also during a forward movement of the vehicle. This enables said means to take a wholly or partially static form. Said means can more particularly be placed at or suspended on a fixed location. Said means can then be provided with a moving means for performing a one-dimensional movement, such as extending an arm, for instance an arm of a wrapping device or a cutting device, rotating a spraying, illuminating or recording means round an axis. When necessary, two one-dimensional movements can also be performed. This makes the embodiment of said means simpler and, thereby, considerably cheaper.

These aspects of the invention, elucidated above in more detail, are very advantageous for use in combination with standard holders such as Danish trolleys. They are nevertheless also suitable for application in combination with holders designed specifically to be combined with the vehicles according to the different aspects of the invention. The further aspects can moreover be combined with one or more of the embodiments which are indicated above and/or described in one of the sub-claims, and which are more particularly elucidated with reference to the accompanying figures. It is noted for the sake of completeness that where a first driven wheel provided with a drive means is specifically described in the above, this also applies to the second wheel. Where reference is made in the text to a first and a second wheel, it is not precluded that more than two wheels are present.

BRIEF DESCRIPTION OF THE FIGURES

These and other aspects will be further elucidated with reference to the following figures, which are not to scale and in which the same or corresponding components are designated with the same reference numerals, and in which:

FIG. 2 shows holder 200 being lifted by vehicle 100.

In FIG. 6A vehicle 100 is in the empty position, wherein the tray 160 lies in a lowered position relative to chassis 150. In FIG. 6B the vehicle is in a situation in accordance with a loaded position. Tray 160 is here raised relative to chassis 150. A greater ground clearance is hereby obtained.

DETAILED DESCRIPTION OF ILLUSTRATED EXEMPLARY EMBODIMENTS

Figure 1:
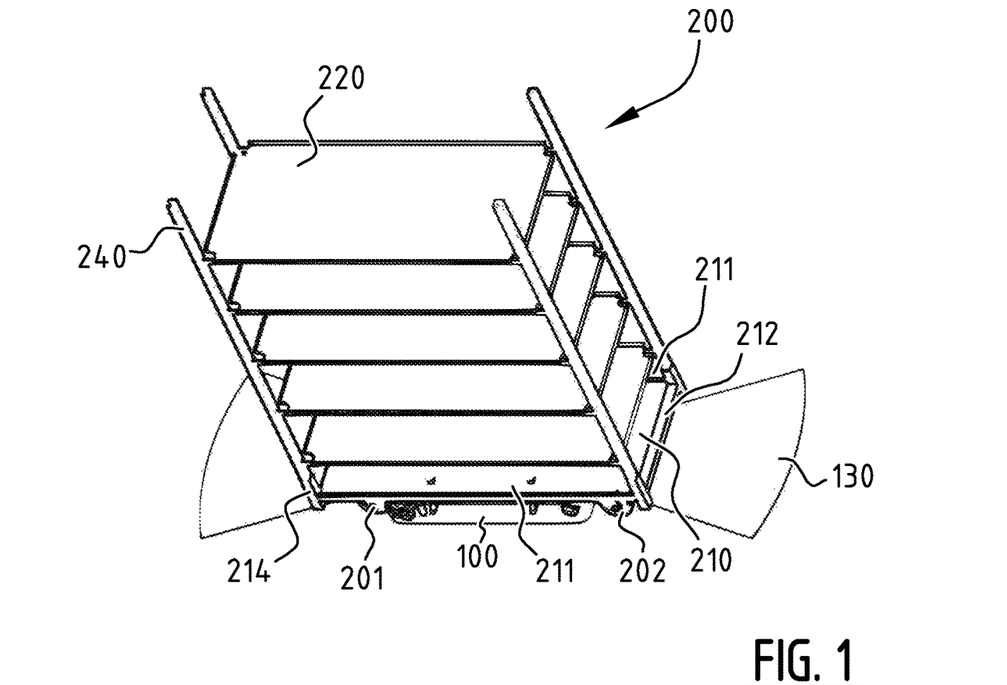
FIG. 1 and FIG. 2 each show a schematic view of the combination of a holder 200 and a vehicle 100. The shown holder 200 is a so-called Danish trolley.
Figure 2:
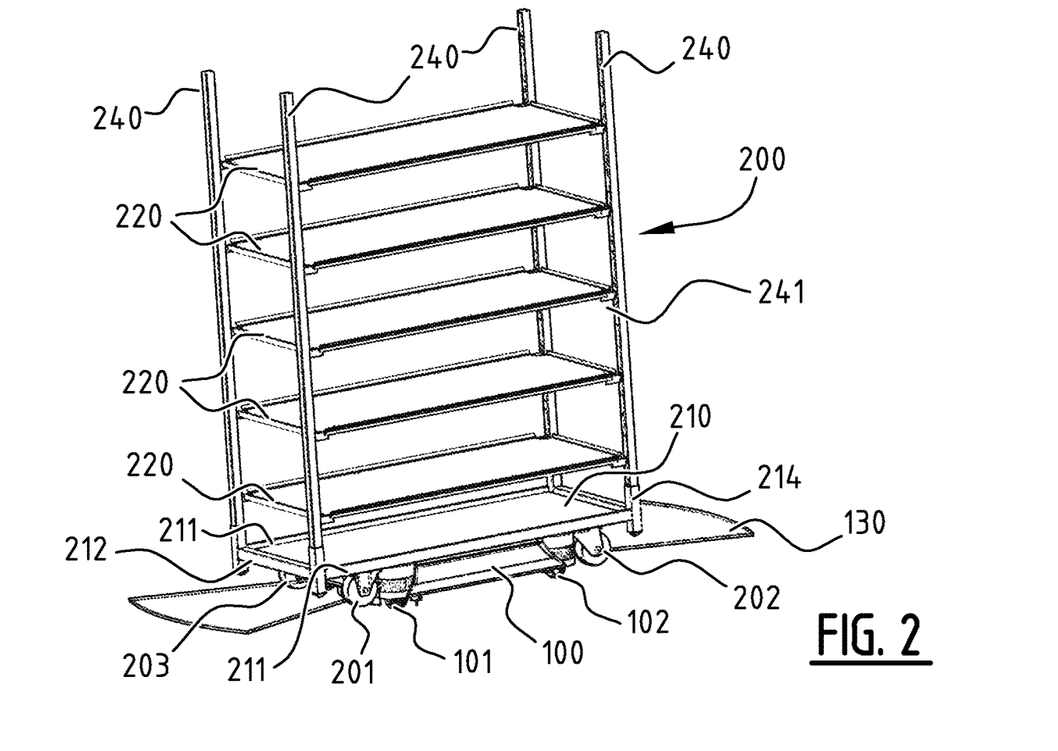

FIGS. 1 and 2 show schematic views in aerial perspective of a combination of a vehicle 100 and a holder 200. The shown holder 200 is a so-called Danish trolley which is provided with a bottom plate 210 and several shelves 220, which are suspended from four vertically oriented bars 240 using mounting elements 241. Bottom plate 201 is surrounded by a frame comprising bars 211 on the longitudinal side and bars 212 on the front and rear side of holder 200. The frame further comprises securing elements 214, in this case taking a hollow form. Holder 200 is further provided with front wheels 201 and rear wheels 202.

Vehicle 100 and the combination of vehicle 100 and holder 200, as shown in FIGS. 1 and 2, are in the loaded position, in which holder 200 is lifted by vehicle 100. A holding means on an upper side of a body of vehicle 100 is for this purpose displaced upward with a moving means. The holding means and the moving means are not shown clearly in FIGS. 1 and 2, but will be described further with reference to further figures.

Figure 4:
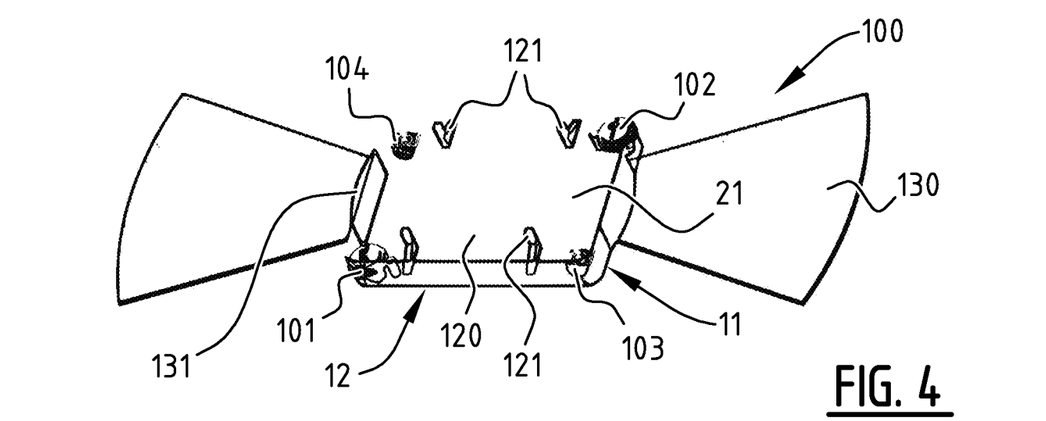
FIG. 4 shows an aerial perspective schematic view of a first embodiment of vehicle 100.

The setup of vehicle 100 is discussed further with reference to FIG. 4, which shows the vehicle in a first embodiment. It is noted that, besides a body 120, vehicle 100 is also provided with wheel modules 101, 102, 103, 104, i.e. wheels plus suspension and optional drive. Because vehicle 100 is in a preferred embodiment suitable to move in all directions, it is somewhat ambiguous to refer to a front and rear side, and/or sides. Nevertheless, in the context of the application reference is made to a longitudinal direction, extending parallel to the longitudinal direction between the front and rear side of holder 200, and a width direction perpendicular thereto. Reference is thus made to a front and rear side 11 of the vehicle (which are identical in the shown embodiment), and to sides 12. The vehicle is further provided with an upper side 21. Specific attaching means 121 are further visible in the embodiment of FIG. 4. It is possible to envisage a plate or other element being connected to the shown attaching means 121 in order to thus support a larger surface of the bottom (i.e. bottom plate 210 and frame 211, 212). Although there is no difference between front and rear side 11 in the shown embodiment, it is not precluded that the vehicle is embodied such that a front and a rear side differ from each other, for instance in respect of the embodiment of optical sensors and/or in respect of the embodiment of the motors of wheels 101-104.

In the shown embodiment it otherwise makes sense to distinguish front and rear side 11 from sides 12; firstly, the dimensions of vehicle 100 are preferably not wholly equal in the longitudinal direction and in the width direction. It is deemed favourable for the ratio of the dimensions in the longitudinal and width direction to lie between 1.0:1 and 2.0:1, preferably between 1.1:1 and 1.8:1, such as 1.3:1 to 1.7:1. This ratio is particularly advantageous when the holders are Danish trolleys. A different ratio can optionally be chosen for other holders. Nevertheless, the chosen ratio is deemed advantageous. Secondly, the one or more moving means 165, 166 (see FIG. 7) are preferably situated only on the sides 12 and not on the front or rear side 11. It is further possible for the optical sensors 131 on front and rear side 11 to differ from those on sides 12. The optical sensors 131 on the front and rear side 11 are intended to record an image during displacement of vehicle 100 together with holder 200. This is generally a movement in an open space. The displacement of vehicle 100 in the width direction is provided in particular for passing under holders 200. In that case the total mass is smaller, whereby vehicle 100 can brake more quickly. Fewer obstacles are moreover to be expected. Different sensors can thereby be used on sides 12 than on front or rear side 11. The optical sensors on sides 12 are for instance configured to detect objects at a shorter distance and/or with a lower resolution. If a light source is applied as part of an optical sensor 131, which is deemed advantageous, a less strong light source can suffice, which is thereby more energy-efficient. It is further possible for image field 130, as designated for the front and rear side 11 in FIG. 1-5, to cover a less wide angle on side 12 and/or for a plurality of optical sensors, each showing only a small image field, to be present per side. In an exemplary embodiment there are for instance 2-10 optical sensors per side 12, for instance 2-6.

Figure 3:
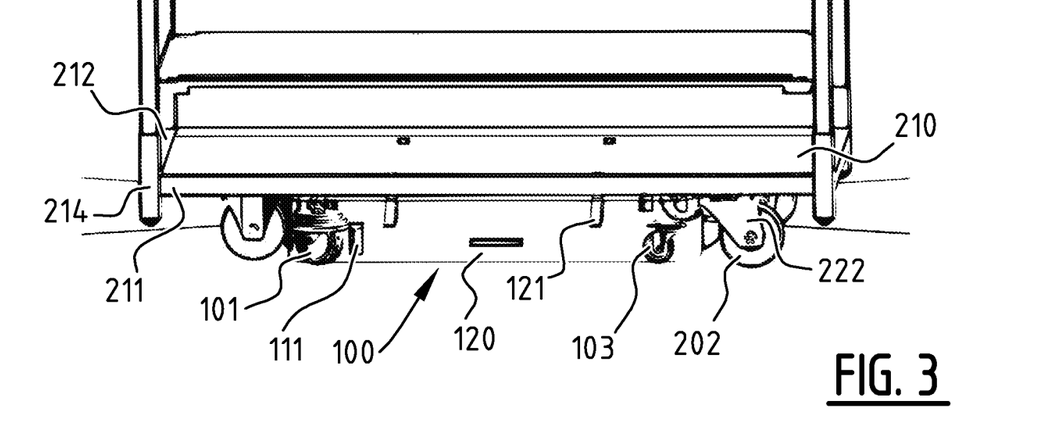
FIG. 3 shows a schematic side view of the combination as shown in FIG. 1, at least partially.

FIG. 3 further shows a schematic side view of the combination of holder 200 and vehicle 100. For the sake of clarity only a lower portion of holder 200 is shown here. It is clearly visible in this FIG. 3 that vehicle 100 is provided, at least in this embodiment, with two types of wheel module: a first with a motor-driven wheel 101 and a second with a stabilizing wheel 103. The stabilizing module 103 of the stabilizing wheel is configured to adjust to the direction of travel set by the first wheel module 101. It is further shown that wheels 202 of holder 200 are suspended in a housing 222. Adjustment of the direction of travel of driven wheel 101 is achieved with a controlling means 111 (designated in FIG. 7 with reference numeral 171).

Figure 5:
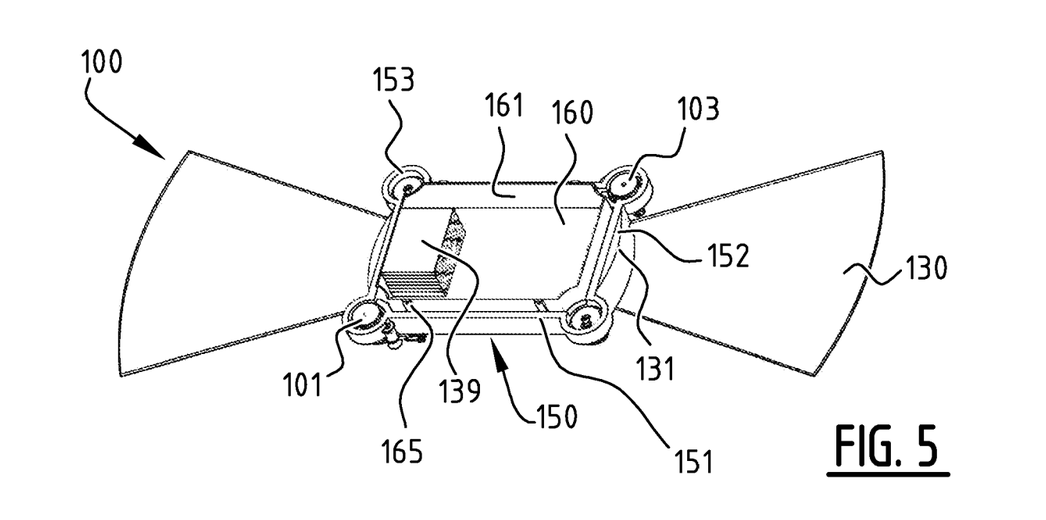
FIG. 5 shows an aerial perspective schematic view of a second embodiment of vehicle 100.

FIG. 5 shows the vehicle 100 in a second embodiment. The body is formed here by the whole of a chassis 150 and a tray 160. Although not shown in FIG. 5, the tray is generally and at least partially closed with a cover. In a further implementation this cover then also forms the holding means on which the holder rests in the loaded position. In the specific embodiment of FIG. 5 chassis 150 comprises longitudinal beams 151, transverse beams 152 and wheel module holders 153. These wheel module holders 153 are situated at the corners between longitudinal beams 151 and transverse beams 152. In the shown version there are four wheel module holders 153. This provides for a good stability. The design of chassis 150 moreover allows for application of more than two driven wheel modules 101, 102. In the shown embodiment the wheel module holders 153 are placed such that the wheels of wheel modules 101-104 are substantially aligned with the longitudinal beams 151 and the transverse beams Nevertheless, it is not precluded that wheel module holders 130 are placed such that one or more wheels are aligned not with said longitudinal and/or transverse beams 151, 152, but are shifted laterally inward or outward.

Tray 160 is provided with an upright edge 161. In the shown embodiment guide means 165 are present on an outer side of this edge 161. These guide means 165 are configured for co-action with guide means 166 on chassis 150, particularly on longitudinal beams 151 thereof, corresponding therewith. In this respect it is advantageous for longitudinal beams 150 and transverse beams 152 of chassis 150 to be embodied as upright walls. A different embodiment of for instance the transverse beams 152 is otherwise not precluded. There is space in tray 160 for placing of electrical and other components which are necessary for the proper functioning of the vehicle, such as for instance a battery 139. It is further advantageous for support elements (not shown) to be present in tray 160 in order to thus support the mass of holder 200. These support elements are preferably arranged such that they support the metal bars 211, 212 at the bottom of the holder. Besides support elements, specific attaching means can moreover be placed in tray 160. A favourable example of such attaching means is for instance a magnet, particularly an electromagnet, which is placed to act on a bar 211, 212 by means of an (electro)magnetic force. Holder 200 can thereby be secured without holder 200 necessarily having to be adapted. The securing is deemed particularly desirable when a large mass is to be displaced, for instance a mass greater than 500 kg or even greater than 1000 kg. Application of a holding means in the form of a rough and/or tough surface, which is preferably able to adhere physically, such as for instance a rubber-elastic element, then does not appear sufficient any longer.

Figure 6A:
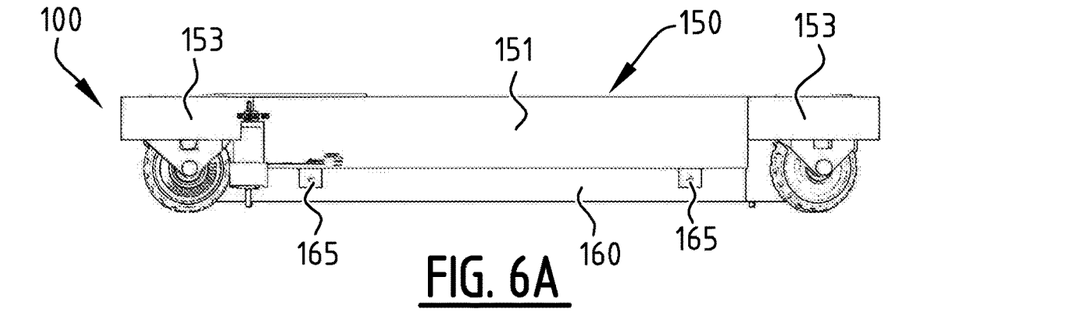
FIG. 6A and 6B show schematic side views of vehicle 100 according to the second embodiment shown in FIG. 5.
Figure 6B:
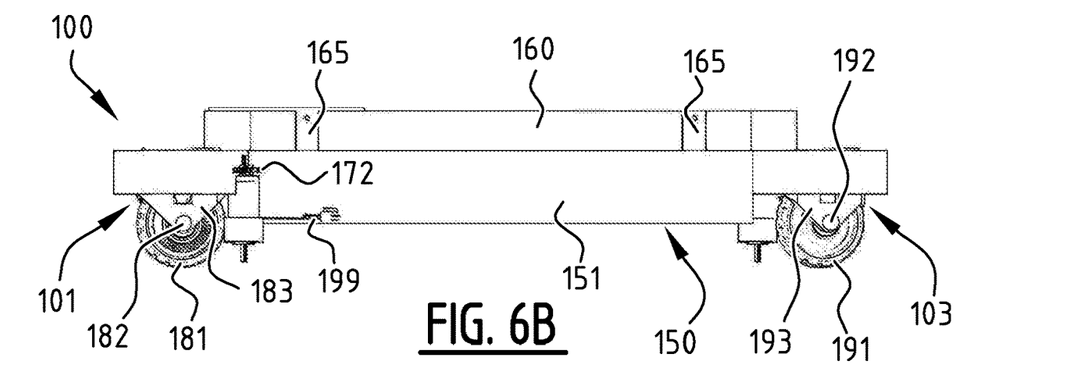

In addition, sensors which are configured to detect the holder can be incorporated in tray 160. These sensors are thus directed upward. Examples of suitable sensors are optical sensors, such as an image sensor/or digital camera, and so-called proximity sensors. Such sensors are aimed in particular at detecting the metal bars 211, 212 of the frame of holder 200. These are then particularly the bars 211 on the sides, under which the vehicle generally passes in order to reach a predetermined position under holder 200. Instead of in tray 160, such sensors can also be mounted on chassis 150. FIG. 6A and 6B show vehicle 100 according to the second embodiment shown in FIG. 5, in corresponding schematic side views. In FIG. 6A tray 160 is in a first or low position, which corresponds to the empty position of vehicle 100. In FIG. 6B tray 160 has been raised to a second, high or lifted position. When vehicle 100 is then placed under a holder 200, holder 200 is lifted and vehicle 100 is in the loaded position. Lifting of tray 160 takes place with guide means 165 on tray 160 and guide means 166 on chassis 150 (shown in FIG. 7). In a specific embodiment the guide means comprise a gear rack. Comparison of FIGS. 6A and 6B shows that there is space between tray 160 and a floor (not shown) when tray 160 is in the second, raised position, as shown in FIG. 6B. This creates so-called ground clearance, which means that vehicle 100 is not hindered by bumps or possible loose objects or matter on a floor and/or by unevenness in the floor. Besides unevenness in the floor it is possible to envisage here leaves and/or humid soil and so on, which can stick to an underside of tray 160; branches and other objects over which a wheel can pass but which can become wedged between floor and tray 160; sand, thresholds or other elements which can cause scratches and other damage. It is noted that vehicle 100 can also move with tray 160 in the second, raised position, also without a holder 200 being transported. In an implementation the control is set such that the tray is lifted into the second, raised position when the vehicle 100 has to bridge a predetermined minimal distance, without the vehicle having to pass under a holder 200 or other element. This distance can be estimated on the basis of data present in a memory of the control unit and/or on the basis of image recording.

Figure 8:
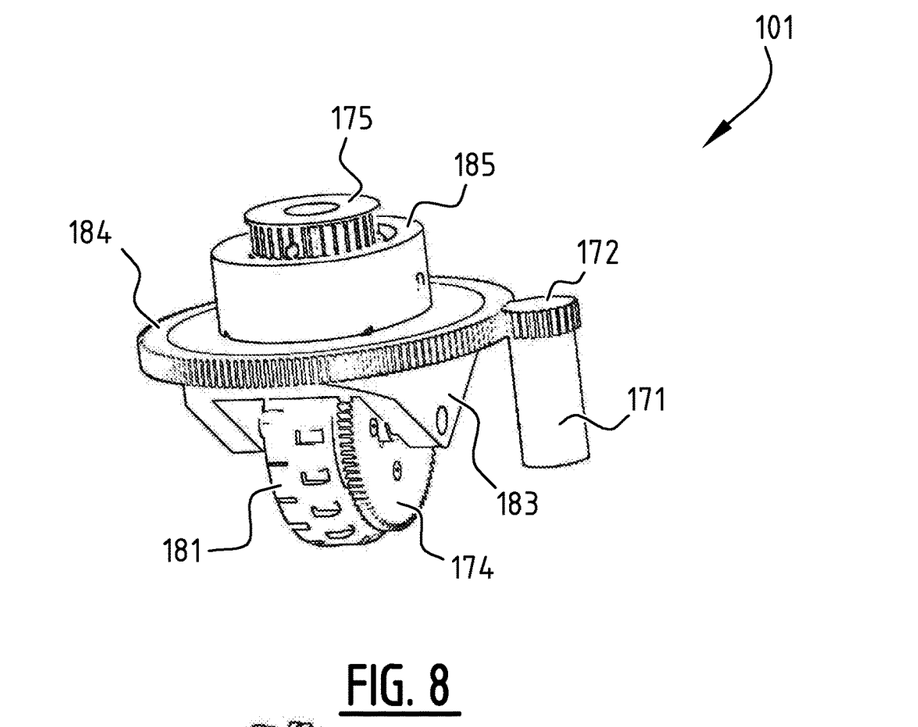
FIG. 8-10 show wheel module 101 in more detail, which module is provided with the separate drive means 175 for forward movement and a controlling means 171 for adjusting the orientation of wheel 181.
Figure 9:
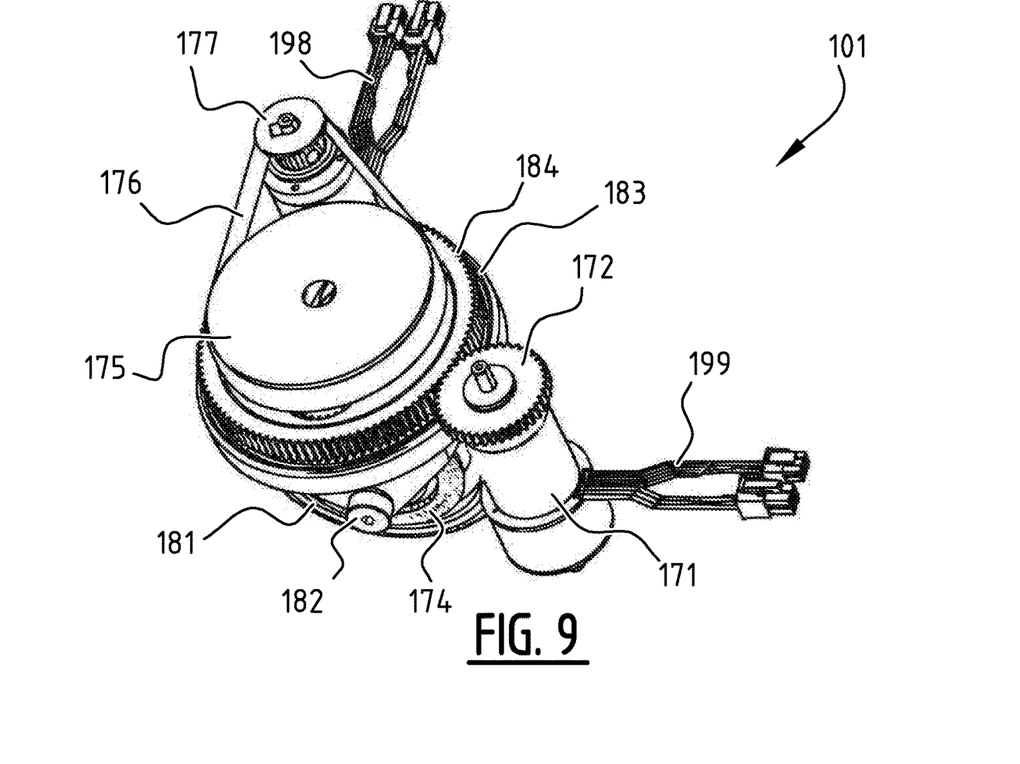
Figure 10:
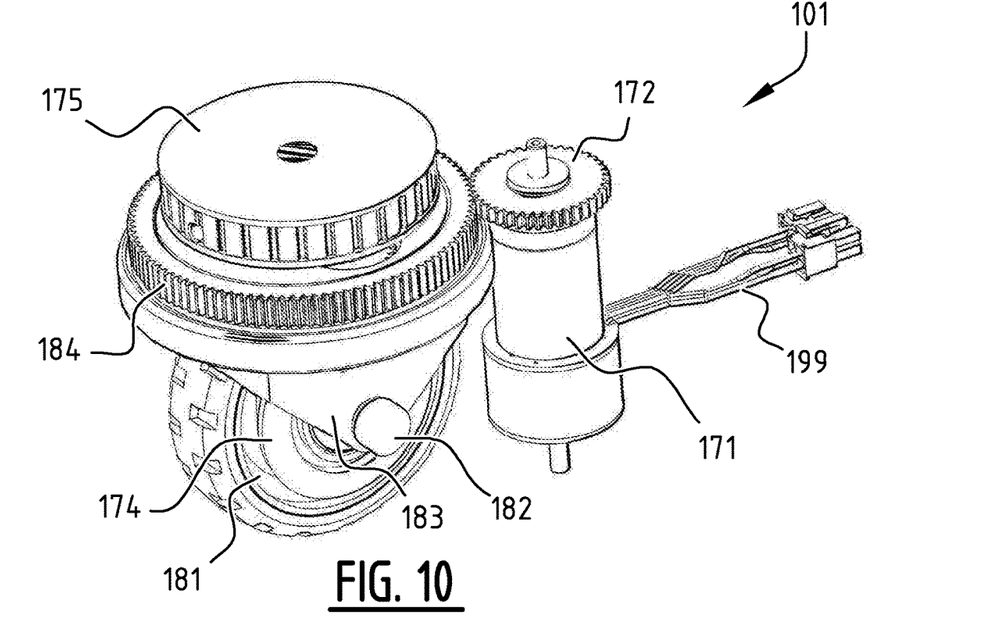

FIGS. 6A and 6B further show the embodiment of the shown second embodiment of vehicle 100 in more detail, wherein the components are provided with reference numerals in FIG. 6B. The first 'drive' wheel module 101 comprises a housing 183 in which a wheel 181 is suspended on a wheel axle 182. This wheel module 101 is further provided with a controlling means 171, here taking a cylindrical form with a vertically oriented axis. A toothed wheel 172 is present which provides for the transmission to the wheel via means with favourable implementations which are shown in FIGS. 8, 9 and 10. Controlling means 171 is operated with an electric motor 199. In these schematic embodiments electric motor 199 is situated on an outer side of chassis 150, and without further protection. It will be understood that, in practice, this electric motor 199 will be protected from mechanical damage, dust and otherwise, for instance by means of a casing and/or by electric motor 199 being integrated into or fixed to chassis 150. Stabilizing wheel module 103 is embodied correspondingly with a housing 193, in which wheel 191 is suspended with a wheel axle 192. Stabilizing wheel module 103 is however not provided with a controlling means 171. Even if stabilizing wheel module 103 is provided with a drive means for accelerating wheel 191, it is not necessary, nor favourable, for this stabilizing wheel module 103 to be provided with a controlling means 171.

Figure 7:
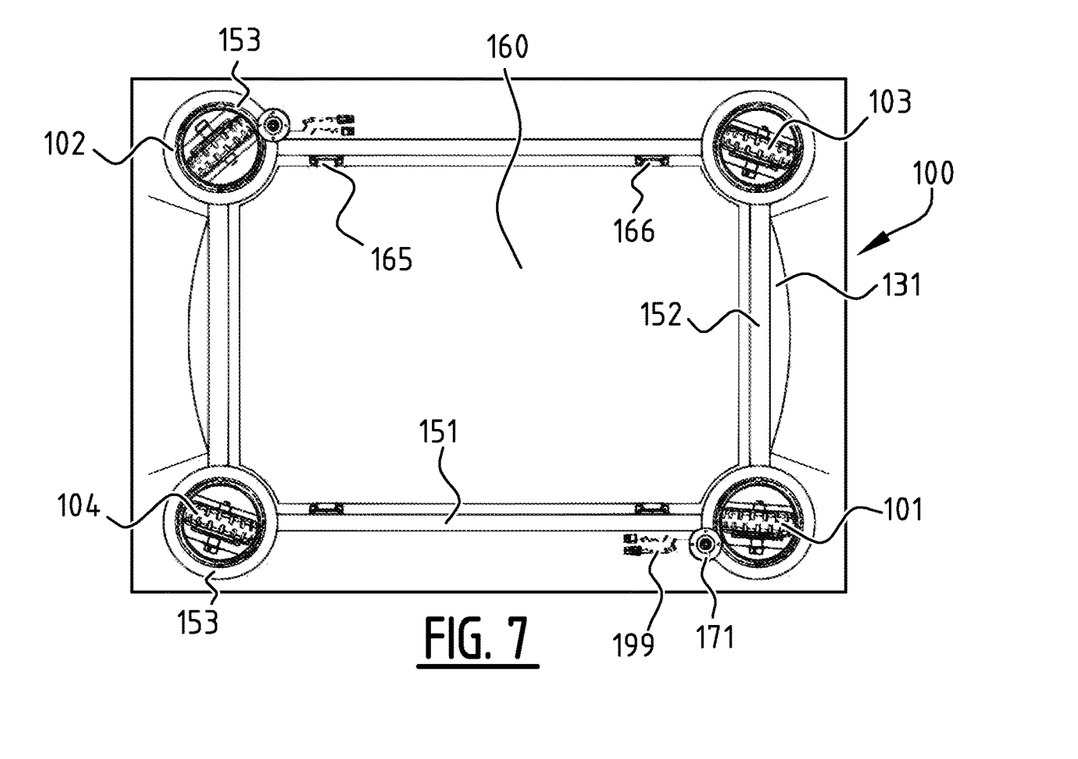
FIG. 7 shows a schematic bottom view of vehicle 100.

FIG. 7 shows the vehicle 100 according to the second embodiment in a bottom view. It is clearly visible in this figure that chassis 150 forms a frame on the basis of transverse beams 152 and longitudinal beams 151, and without a bottom. It is otherwise not precluded that chassis 150 is provided with more than two transverse beams 152, wherein tray 160 is divided into several trays which are individually height-adjustable with guide means 165, 166. Where the guide means 165 mounted on tray 160 is in the shown embodiment situated only on the upright side edge 161 (see FIG. 5), it is not precluded that this guide means 165 be mounted on the underside of tray 160, or on an underside and side edge.

FIG. 8-10 more particularly show the first wheel module 101 with drive. FIG. 8 shows a first embodiment and FIG. 9-10 show a second embodiment. As already discussed, wheel 181 is suspended with a wheel axle 182 in a housing 183 and a controlling means 171 is present which provides for the adjustment of the orientation of the wheel via a transmission means, here embodied as a toothed wheel 172. Toothed wheel 172, which is situated on an outer surface of the vertically oriented controlling means 171, co-acts for this purpose with a toothed wheel which is here embodied as part of the housing 183. In the first embodiment this housing is further provided with a bushing 185. The mass of the body of vehicle 100, and in the loaded position likewise the mass of holder 200, rests on this bushing 185. Situated inside the bushing is a toothed belt pulley 175. This is connected to a toothed wheel 174 which is connected to wheel 181 and/or to wheel axle 182. Rotation of toothed belt pulley 175 results in rotation of toothed wheel 174 on wheel axle 182. When toothed wheel 184 on housing 183 rotates, toothed belt pulley 175 does not co-rotate. The views of FIGS. 9 and 10 furthermore show electric motors 198, 199, and also the toothed belt 176 and a second toothed belt pulley 177 which is coupled to the electric motor. The toothed wheel 174 on wheel axle 182 is embodied here as a bevel gear. It is visible that toothed belt pulley 175 rests on a bearing. In this example the mass of the body of the vehicle rests on housing 183. This housing is attached to the chassis with a rotatable connection.

Figure 11:
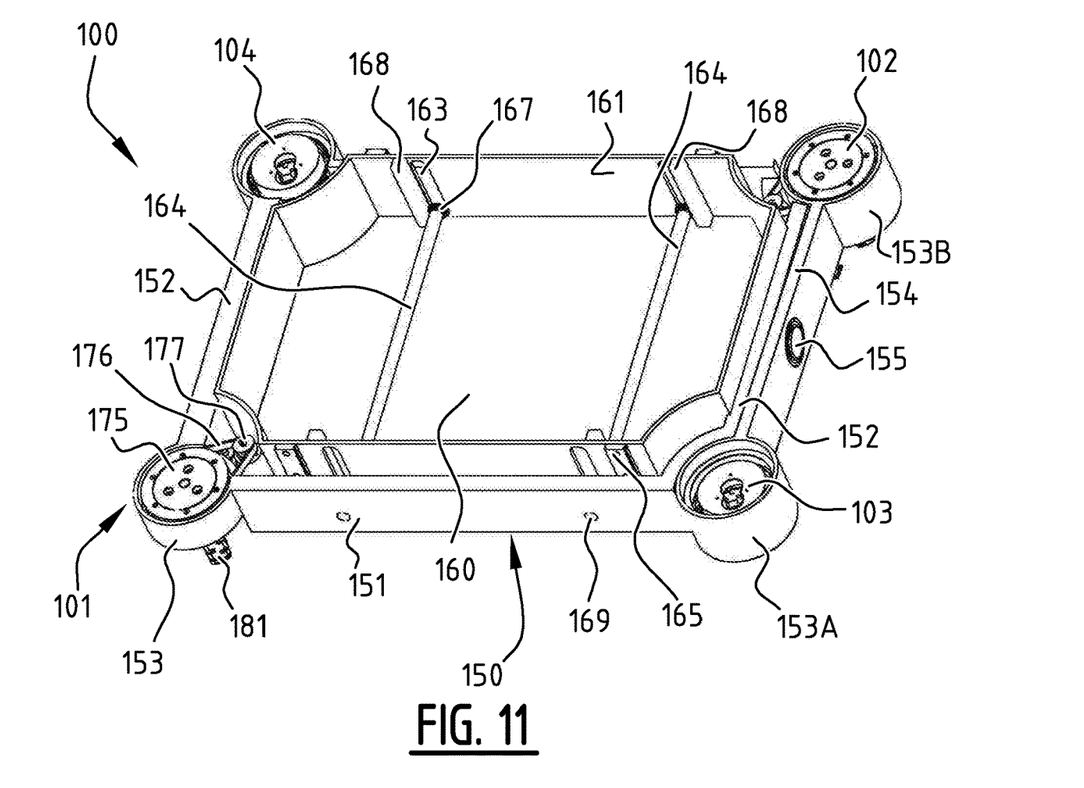
FIG. 11 shows an aerial perspective schematic view of a third embodiment of vehicle 100.

FIG. 11 shows an aerial perspective schematic view of a third embodiment of the vehicle 100 according to the invention. This embodiment is similar in many respects to the second embodiment shown in FIG. 5. It is furthermore designated herein how first wheel 101, as shown in more detail in FIGS. 9 and 10, can be incorporated in the chassis 150 of vehicle 100.

FIG. 11 moreover shows a further development of the moving means with which tray 160 is mounted on chassis 150 and with which tray 160 can be adjusted in the height. More particularly, holes 163 are arranged in side walls 161 of tray 160. In the shown embodiment the holes are situated on the longitudinal sides, parallel to the longitudinal beams 151 of chassis 150. A shaft 164 runs through each of the holes 163, in this example a total of 4. In this example shaft 164 is cylindrical and extends from the one longitudinal beam 151 to the opposite longitudinal beam 151 of chassis 150. The outer ends 169 of shaft 164 are fixed in longitudinal beams 151. It is however not precluded that shaft 164 does not extend over the whole width of vehicle 100, but that there are instead several, shorter, shafts, for instance one per hole 163. The shown implementation however has the advantage that sufficient stiffness is obtained owing to the fixing to longitudinal beams 151 on either side. A toothed wheel 167, which co-acts with a rack 168, is present on shaft 164. By rotation of shaft 164 the toothed wheel moves along rack 168, whereby the height of tray 160 relative to chassis 150 changes. Shaft 164 and rack 168 here preferably have an operation complementary to guide means 165, 166.

FIG. 11 further shows a specific embodiment of chassis 150. A set of wheel module holders 153 A,B (in the drawing on the rear side) is here connected to chassis 150 using an additional transverse beam 154. This additional transverse beam 154 is connected with a rotatable shaft 155 to the first transverse beam 152. Rotatable shaft 155 extends perpendicularly of the transverse beams 152, 154. Transverse beam 152 and the additional transverse beam 154 can thus move relative to each other just as two scissor blades. The one wheel module holder 153A can thus be lifted slightly, while the other wheel module holder 153B conversely moves downward slightly. This mechanism ensures that these wheels 101-104 all stay in contact with the floor, even when the floor is not completely level. It is noted that, instead of an additional transverse beam 154, there could be an additional longitudinal beam. It is further noted that, instead of one additional transverse beam 154, there could be two additional transverse beams, each connected to a transverse beam. It is further noted that the shaft 155 and the additional transverse beam 154 are preferably embodied such that the maximum angle between the transverse beam 152 and the additional transverse beam 154 is limited. It is also possible to provide for a spring means or resistance means with a built-in tendency to reduce said angle.

In short, the invention relates to a robotic vehicle and use thereof for displacing a holder for goods, which is for instance loaded with goods, which vehicle can be operated in an empty position and a loaded position, comprising of (1) moving the robotic vehicle to a position under the holder in a first direction, wherein the robotic vehicle is in the empty position, wherein a holding means is countersunk in a body of the vehicle; (2) lifting the holder, wherein the robotic vehicle lifts the holder by performing a vertical movement of the holding means relative to the wheels of the vehicle, such that the holding means comes into contact with an underside of the holder, wherein the robotic vehicle transfers to the loaded position; (3) rotating driven wheels of the robotic vehicle from the first direction to the second direction without the body of the vehicle being rotated, and (4) displacing the robotic vehicle in the loaded position in a second direction, wherein the first and second direction enclose a mutual angle of between 60 and 120 degrees, preferably 75 and 105 degrees, more preferably 85 and 95 degrees, such as a substantially right angle.

According to a further aspect of the invention, a robotic vehicle is provided which is suitable for displacing a holder for goods, which vehicle is configured to move to a position under the holder, to lift the holder and to displace the holder, and which vehicle comprises a body, a first and a second wheel, which wheels are motor-driven, and at least one further wheel. The vehicle further comprises (1) a holding means for carrying the holder, which holding means is situated on an upper side of the body; (2) a moving means for performing a vertical movement of at least the holding means between an empty position and a loaded position, in which empty position the vehicle is able to pass under the holder and in which loaded position the vehicle carries the holder, such that when the vehicle moves, the holder is carried along; (3) a control unit for controlling the vehicle and controlling the first and the second wheel and the moving means. The holding means is here configured to secure one or more bars situated on either side of a bottom of the holder.

The vehicle more particularly has a longitudinal direction and a width direction, which width direction is perpendicular to the longitudinal direction, and wherein the one or more bars preferably extend in the longitudinal direction.

In a first, favourable embodiment the bars comprise magnetic or magnetizable material, wherein the holding means comprises a magnet, for instance an electromagnet. This is an advantageous manner of attracting the bars of the holder and thus securing the holder. This embodiment is particularly favourable when the holder has a very great mass in loaded position.

In a second embodiment the holding means is embodied as a layer of rubber-elastic material. This embodiment is simpler from a technical viewpoint and is suitable for holders, such as Danish trolleys, which are loaded with plants.

It is further advantageous for the vehicle to comprise at least four motor-driven wheels. This is particularly advantageous in combination with the first embodiment.

In a related aspect the invention relates to a combination of a robotic vehicle and a holder for goods, wherein the robotic vehicle is configured to move to a position under the holder, to lift the holder and to displace the holder, wherein the robotic vehicle according to the above described aspect is present, and wherein the holder is provided with a bottom and bars situated on either side of the bottom. The bottom here preferably comprises a bottom plate. The holder more preferably comprises a frame on the basis of bars, wherein two or more pairs of bars extending in substantially perpendicular directions relative to each other are present at one or more levels, which bars are configured, together with a carrier plate, for the placing of goods, wherein vertically oriented bars are present between the levels. An example of such a holder is a Danish trolley.

In a further related aspect the invention relates to the use of the robotic vehicle according to the above described aspect for the purpose of displacing a holder for goods, which is for instance loaded with goods, which holder is provided with a bottom and bars situated on either side of the bottom. This use preferably comprises the steps of:
(1) Providing a row of mutually coupled holders, of which at least a second holder and optional further holders are provided with wheels;
(2) Moving the robotic vehicle to a position under the first holder;
(3) Lifting the first holder;
(4) Moving the robotic vehicle in a direction of travel, wherein the vehicle with the first holder pulls along the other holders in the row.

In a further embodiment the use further comprises the steps of displacing only the first holder after moving of the vehicle and uncoupling of the first holder from the other holders and/or prior to providing of the row, wherein the first holder is displaced by the robotic vehicle.

In another embodiment, which can be combined with the foregoing embodiments of the use, the robotic vehicle is moved from a second direction to a position under the first holder, which second direction in particular encloses an angle with the direction of travel of between 60 and 120 degrees, preferably between 75 and 105 degrees, such as between 85 and 95 degrees, for instance a substantially right angle.

In yet another aspect the invention relates to a system of at least one robotic vehicle as described above and a central control unit configured to control the one or more robotic vehicles.

It is noted that the robotic vehicle, the combination therewith, the use thereof and the system therewith can further be embodied in accordance with the embodiments and implementations stated elsewhere in this patent application, such as for instance specific implementations for lifting the holder, the implementations for displacing the vehicle in two mutually perpendicular directions, implementations for wireless communication between the vehicle and a central control unit, and the use of sensors. Nevertheless, the implementations stated above and elaborated in the application are not per se necessary.

It is noted that it is not precluded that the robotic vehicle comprises the favourable construction of the rotatably suspended wheels, wherein the wheels are preferably provided with separate drive means and are each situated in a wheel module which can form part of a chassis, without the holding means of the vehicle being situated on the upper side of the body. It is for instance possible for the holding means to be insertion means which can be placed under a holder, analogous to the operation of a forklift truck.

REFERENCE NUMERALS

11 front side of vehicle 100
12 side of vehicle 100
21 upper side of vehicle 100
100 vehicle
101 wheel module of the first wheel
102 wheel module of the second wheel 103 wheel module of a further wheel, in the shown embodiments a stabilizing wheel without drive
104 wheel module of a further wheel
120 body
121 attaching means
130 image field of optical sensor 130
131 optical sensor
139 battery
150 chassis
151 longitudinal beam of chassis 150
152 transverse beam of chassis 150
153, 153A, 153B wheel module holder
154 additional transverse beam
155 shaft
160 tray
161 side wall of tray 160
163 hole in the side wall 161 of tray 160
164 shaft extending through hole 163
165 guide means on tray 160
166 guide means on chassis 150
167 toothed wheel on shaft 164
168 rack co-acting with toothed wheel 167
169 outer ends of shaft 164
171 controlling means, vertically oriented axis
172 toothed wheel on controlling means
174 toothed wheel parallel to wheel 181, optionally embodied as bevel gear
175 toothed belt pulley, connected to toothed wheel 174; toothed belt pulley 175 does not co-rotate with toothed wheel 184
176 toothed belt for transmission
177 second toothed belt pulley, coupled to electric motor 198
181 wheel
182 wheel axle
183 housing of wheel 181
185 bushing
184 transmission means, embodied as toothed wheel lying horizontally
198 electric motor for drive means, effectively formed by the combination of pulleys 175, 177, toothed belt 176 and toothed wheel 174
199 electric motor for controlling means 171
200 holder
201 front wheel of holder 200
202 rear wheel of holder 200
210 bottom plate
211 metal bars on either side of bottom plate 210, in width direction
212 metal bars on either side of bottom plate 210, in longitudinal direction
214 securing element for vertically oriented bar 240
220 shelf
222 housing for wheel 201, 202
240 vertically oriented bars of holder 200
241 mounting element for shelf 220

The invention claimed is:

1. A vehicle suitable for displacing a holder for goods, wherein the vehicle is configured to move to a position under the holder, to lift the holder and to displace the holder, the vehicle comprising:
a body;
a first and a second wheel;
a driver co-acting with the first and the second wheel;
at least one further wheel;
a holding means configured to carry the holder, wherein the holding means is situated on an upper side of the body;
a mover configured to perform a vertical movement of at least the holding means between an empty position and a loaded position, in which empty position the vehicle is able to pass under the holder and in which loaded position the vehicle carries the holder, such that when the vehicle moves, the holder is carried along; and
a control unit for controlling the vehicle and controlling the first and the second wheel and the mover,
wherein the first and the second wheel are mounted rotatably on the body,
wherein the control unit is configured such that the vehicle can be moved in at least two directions of travel which are perpendicular relative to each other,
wherein the body further comprises a tray, which tray is mounted movably on a chassis, wherein the chassis is situated on an outer side of the tray,
wherein the tray is provided with an upright side edge extending upward from the tray surface to form a space in the tray for placing components, and
wherein the tray is provided with a cover situated on an upper side of the tray to form the holding means.

2. The vehicle of claim 1,
wherein the body comprises the chassis and the chassis includes wheel module holders, and
wherein the first and the second wheel each form part of a wheel module which is situated in a wheel module holder of the chassis.

3. The vehicle of claim 2,
wherein the chassis comprises a first and a second longitudinal beam and a first and a second transverse beam, which longitudinal beams and transverse beams are embodied as upright walls, and
wherein the wheel module holders are situated in corners between in each case a transverse beam and a longitudinal beam.

4. The vehicle of claim 3,
wherein the mover comprises guides between the chassis and an element placed inside the chassis, and
wherein the guides are situated on the longitudinal beams or on the transverse beams.

5. The vehicle of claim 3, wherein the chassis is configured to adjust a height of a wheel module holder relative to the chassis.

6. The vehicle of claim 3,
wherein the mover is configured to perform a vertical movement of the tray relative to the chassis, and
wherein the mover comprises one or more guide that are situated between the chassis and an upright side edge of the tray.

7. The vehicle of claim 3,
wherein optical sensors for recording images are present on at least one side of the vehicle,
wherein the optical sensors are situated on the chassis or in a module which is coupled to the chassis, and
wherein the control unit is configured to control the vehicle partly on a basis of the recorded images.

8. The vehicle of claim 1, wherein the driver includes a first driver for the first wheel and a second driver for the second wheel.

9. The vehicle of claim 8,
wherein the first wheel is mounted on the body at a first position and the second wheel is mounted on the body at a second position, wherein the second position differs from the first position both in a longitudinal direction and in a width direction, and wherein the first wheel and the second wheel optionally lie on a diagonal relative to each other.

10. The vehicle of claim 9, wherein the first driver is configured to rotate the first wheel about an axle, and wherein the vehicle includes a controller configured to adjust an orientation of the first wheel relative to the longitudinal direction.

11. The vehicle of claim 10, wherein the controller comprises a vertically oriented shaft, which shaft is driven by an electric motor.

12. The vehicle of claim 1, wherein the holding means comprises a layer of rubber-elastic material.

13. The vehicle of claim 1, further comprising:

at least one sensor aimed at detecting the holder situated on an upper side of the vehicle, wherein the at least one sensor is preferably situated on one or both sides of a bottom plate of the holder, and wherein the control unit is configured to:
  (i) analyze detected data in order to determine an orientation of the vehicle relative to the holder;
  (ii) control a driver of the first wheel and/or the second wheel when the orientation of the vehicle has to be adjusted in order to achieve a predetermined relative orientation;
  (iii) analyze detected data in order to determine a positioning of the vehicle relative to the holder; and
  (iv) control the first and the second wheel when the positioning of the vehicle has to be adjusted in order to achieve a predetermined placement.

14. The vehicle of claim 13, wherein the control unit is configured to use data detected during movement of the vehicle relative to the holder for determining a relative orientation.

15. The vehicle of claim 13, wherein the vehicle is provided with a first and a second optical sensor which are configured to record mutually differing parts of the holder, wherein the first and second optical sensors are optionally situated on the same side of the body, and wherein the first optical sensor is situated closer to a front side than the second optical sensor.

16. The vehicle of claim 1, wherein the vehicle includes a front side and a rear side and the holder for goods, and wherein the vehicle is configured to move to a position under the holder for goods, to lift the holder for goods, and to displace the holder for goods.

17. The vehicle of claim 16, wherein the holder for goods is provided with a frame on a base basis of bars, wherein two or more pairs of bars extending in substantially perpendicular directions relative to each other are present at one or more levels, wherein the bars are configured, together with a carrier plate, for placing of goods, wherein vertically oriented bars are present between the levels, and wherein the holder optionally includes wheels mounted on a lowest level.

18. The vehicle of claim 1, wherein a system includes the vehicle and a central control unit, and wherein the central control unit is configured to control the vehicle.

19. The vehicle of claim 18, wherein one or more of the following applies:
  (i) the vehicle includes a transmitter and a receiver for wireless communication with the central control unit,
  (ii) the system includes a static recorder at a first location, and wherein the central control unit is configured to send instructions to the vehicle so that the vehicle rotates round an axis at the first location, so as to thus facilitate recording of one or more of the following: the vehicle, the holder, or goods on the holder, or
  (iii) the system includes a static processor at a second location, wherein the central control unit is configured to send instructions to the vehicle so that the vehicle rotates round an axis at the second location, so as to thus facilitate a process on one or more sides of the vehicle and/or the holder carried thereby.

20. The vehicle of claim 1, wherein:

the holding means is configured to secure bars situated on either side of a bottom of the holder, the bars comprise magnetic or magnetizable material, and the holding means comprises a magnet.

21. The vehicle of claim 10, wherein one or more of the following applies:
  (i) the first wheel is provided with a toothed wheel which extends parallel to the first wheel and on which the first driver engages,
  (ii) the first driver comprises a toothed belt pulley and a toothed belt, which is connected to an electric motor, or
  (iii) the first wheel is suspended on a housing, wherein the housing is provided with a transmission extending substantially in a horizontal direction, and wherein the transmission is configured to co-act with the controller in order to set a desired orientation of the first wheel, and/or the transmission is a toothed wheel and the controller is provided with a toothed wheel corresponding therewith.

* * * * *